United States Patent Office

3,131,306
Patented Apr. 28, 1964

3,131,306
PROCESS FOR GAGING DIMENSIONS BY MEANS OF RADIATIONS
Morris Weiss, Stamford, Conn., assignor to Barnes Engineering Company, Stamford, Conn., a corporation of Delaware
No Drawing. Filed June 16, 1961, Ser. No. 117,500
5 Claims. (Cl. 250—83.3)

This invention relates to an improved process of measuring the dimensions of objects by means of optical radiations. The term "optical radiations" is intended to cover radiations of wavelength sufficiently short so that the laws of geometric optics are obeyed and include, in addition to visible light, infrared and ultraviolet.

The measurement of objects at a distance and particularly when they are moving, as a continuously extruded steel rod or bar, glass tubing and the like, has presented a serious problem because in many cases it is impractical to use gages which must come in contact with the material. The problem was first solved by a gage described and claimed in the copending patent of Robert W. Astheimer, Patent No. 3,003,064, dated October 3, 1961. In this gage the combination of a moving reticle with a series of openings and an infrared radiation detector results in scanning across the object to be measured, for example a rapidly moving extruded steel rod, which is not only very hot but may be moving at speeds from 50 to nearly 90 miles an hour. As the detector is scanned across the moving material, or more precisely successive small areas of the material are imaged on the detector, an electrical signal is produced because of the great difference in radiation from the material as compared to its background. In the case of hot steel rods or glass tubing these radiations are ordinarily in the fairly short wave infrared, but the principles of the Astheimer gage are equally applicable wherever there is a substantial radiation discontinuity between the material and its background. Thus, the material may be colder than its background, it may reflect differently, for example, light material and the dark background in the visible or vice versa or the background may be illuminated with the radiation desired and the material appear as a relatively opaque silhouette. The Astheimer gage includes electronic circuits which limits the amplitude of the signal produced and which also clamp it to a predetermined reference voltage. This eliminates change in reading due to changes in radiation of the material and the circuits also preferably produce a square wave the width of which is proportional to the width of the material being measured. These circuits ordinarily result in an output which represents the ratio of the time duration of the pulse corresponding to the width of the material divided by the reticle pattern cycle. This eliminates false readings due to different pattern cycle times as when the speed of the rotating reticle changes.

The Astheimer gage has been extremely successful in the continuous monitoring of many materials such as steel rods, bars, glass tubing and the like. However, it has inherently a small inaccuracy, particularly in measuring rounded materials such as steel rods. The inaccuracy is sufficiently small so that it is tolerated in most steel mills or perhaps it might be stated that the gage gives so much more accurate and almost instantaneous readings than was available hitherto that it has surpassed ordinary standards. However, where maximum accuracy is vital the small inaccuracies which result can limit the usefulness of the Astheimer gage or reduce the precision of the results obtainable thereby. It is with a substantially complete elimination of these small errors that the present invention deals.

First, it becomes necessary to consider the limitations on the precision of measurement with the Astheimer gage. These limitations are of two types. First, radiation detectors have finite time responses and as the detector is rapidly scanned across the material to be measured detector output does not instantaneously rise to full limited voltage as the scan crosses from background to a hot rod and conversely does not instantaneously drop to the background level when the scan leaves the rod. In the case of material which radiates less than its background or reflects or transmits less radiation the direction of the response is reversed. If there were an instantaneous response the detector output would be in the form of square waves or rectangular waves with vertical leading and trailing edges. Actually, of course, the rise time is not instantaneous and is sloped so that the wave produced is trapezoidal. For many operations over a limited range of measurement electronic circuits can eliminate the effect of the finite rise time. For example, clamping can be effected between two voltages and a final output square wave produced which is proportional to the actual width measured.

The second cause of inaccuracy which cannot be readily eliminated by electronic circuits, even by quite complex ones, is the fact that as the scan strikes the edge of a rounded material it first encounters the material at grazing incidence at which point little or no radiation is received. Only when the scan has moved a finite distance does it encounter a surface of the material which radiates sufficiently to activate the detector. When the scan leaves the material these phenomena occur, of course, in the reverse order. The result may be thought of as a response which does not take place at the extreme edge of the material being gaged. As a result the actual measurement will produce an output signal corresponding to a somewhat narrower article. The magnitude of the error will also vary with change in the characteristics of the body. This can best be visualized in conjunction with a hot rod. If the temperature changes, the intensity of infrared radiation varies as the fourth power of the absolute temperature. When the scan strikes a round rod at grazing incidence it has to move a shorter distance with a hotter rod in order to receive enough radiation to carry it across the system threshold. The reverse occurs if the temperature is lower. In other words, for a rod of exactly the same shape and the same material the error with a hotter rod is somewhat less than with a colder rod. The reverse, of course, is true where the material is colder than its environment.

The present invention eliminates the above errors which may be considered as edge and detector response time errors by using a reference rod or other material of the size which the material to be monitored is supposed to represent. The output meters or recorders of the gage are then set to a predetermined reading, for example, nulled for a zero center output meter or recorder. The second reference rod is then removed and the material to be monitored takes its place.

The operation may be visualized by using simplified algebraic representation. Let the reference rod width be represented by $L_1$ and the second identical reference rod be $L_2$. Further let the small error due to the edge and detector response time effects be represented by $\Delta$. Then when the output meter or other readout is nulled to a predetermined position the meter response can be considered as $L_1+L_2-2\Delta-L_1-L_2+2\Delta$. The result is obviously the desired zero or null output reading. Now let us remove the second identical reference rod and replace it by the material to be monitored the width of which will be expressed as $L_p$. Now the meter reading is equal to $L_1+L_p-2\Delta-L_1-L_2+2\Delta$ which simplifies to $L_p-L_2$. The direction of the meter reading from the zero setting depends on the relative dimensions of $L_p$ and $L_2$. The errors represented by $\Delta$ are completely eliminated and this is accomplished at the negligible additional cost of an accurate reference rod. One precaution only is necessary and that is that the temperature or other radiation characteristics of the reference rod $L_2$ must be maintained near to that of the material to be monitored otherwise there will be a slight residual error. This is in no sense critical as the resulting error is only a minute fraction of the difference in radiation characteristics. It is so easy to maintain the characteristics of the reference material fairly close to that of the material to be monitored that this possible third order error is negligible and ordinarily cannot be measured.

By means of the present invention a greatly increased precision is obtainable by the addition of a short piece of accurately dimensioned reference material. Where the gage is to be used at different times to measure deviation from predetermined size of materials of different sizes it is necessary to stock a moderate number of small pieces of reference material. The cost is slight, the nulling requires no skill, no precise reading of dials and is capable of extreme accuracy even in the hands of an operator who is semi-skilled.

Some practical figures are illustrative of the results obtainable. With half inch steel rod extruded at a rate of more than 50 miles an hour the Astheimer gage can read dimensions within a tolerance of $\pm.001''$. Present tolerances in steel mills are at least five times as great. However, this is about the limit obtainable with a standard gage and standard electronic circuits. By means of the present invention the precision can be increased as much as an order of magnitude. In fact ordinarily the limit on precision is set by the accuracy of the readout scales.

I claim:

1. A process of monitoring the dimension of material showing a sharp radiation discontinuity with its background which comprises scanning a radiation detector across two reference pieces of material of predetermined identical dimensions, processing electronically the output signal from the detector, adjusting the output signal to a predetermined value, removing one of the identical pieces and substituting therefor the material, the dimension of which is to be monitored, the remaining reference piece being maintained at radiation conditions approximating that of the material to be monitored whereby an electronic readout is obtained which shows deviation of the material to be monitored from the predetermined dimension.

2. A process according to claim 1 in which the material to be monitored is at a different temperature from its background and the infrared radiation therefrom is utilized.

3. A process according to claim 2 in which the material to be monitored is hotter than its background.

4. A process according to claim 1 in which an electronic output is produced proportional to the ratio of the time duration of the pulse corresponding to the dimension of the material to be monitored divided by the dimension of scan cycle.

5. A process according to claim 1 in which the background is translucent and is illuminated from the rear and the material, the dimension of which is to be monitored, is substantially opaque and appears as a silhouette against said background the radiation detector being sensitive to the wavelength of background illumination.

References Cited in the file of this patent

UNITED STATES PATENTS

| 2,412,165 | McDermott | Dec. 3, 1946 |
| 2,488,430 | Offner | Nov. 15, 1949 |
| 2,548,755 | Vossberg et al. | Apr. 10, 1951 |
| 2,699,701 | Strother et al. | Jan. 18, 1955 |
| 2,753,464 | Stone | July 3, 1956 |
| 2,951,159 | Mariner | Aug. 30, 1960 |
| 3,027,457 | Mouly | Mar. 27, 1962 |

FOREIGN PATENTS

| 1,051,016 | Germany | Feb. 19, 1959 |
| 1,068,473 | Germany | Nov. 5, 1959 |